United States Patent
Huebner et al.

(10) Patent No.: US 9,969,331 B2
(45) Date of Patent: May 15, 2018

(54) METHOD AND DEVICE FOR PRODUCING A MASKING INSTRUCTION, AS WELL AS FOR MASKING IMAGE INFORMATION FROM A CAMERA

(71) Applicant: Robert Bosch GmbH, Stuttgart (DE)

(72) Inventors: Michael Huebner, Hemmingen (DE); Thomas Schoeberl, Hildesheim (DE); Steffen Abraham, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 22 days.

(21) Appl. No.: 15/147,987

(22) Filed: May 6, 2016

(65) Prior Publication Data
US 2016/0344973 A1 Nov. 24, 2016

(30) Foreign Application Priority Data
May 22, 2015 (DE) .................. 10 2015 209 391

(51) Int. Cl.
*G06T 11/00* (2006.01)
*B60R 1/00* (2006.01)
*G06T 7/80* (2017.01)

(52) U.S. Cl.
CPC .............. *B60R 1/00* (2013.01); *G06T 7/80* (2017.01); *B60R 2300/306* (2013.01); *G06T 2207/30252* (2013.01)

(58) Field of Classification Search
USPC ........................................................ 382/283
See application file for complete search history.

(56) References Cited

U.S. PATENT DOCUMENTS

| | | | | |
|---|---|---|---|---|
| 9,056,630 B2* | 6/2015 | Han | ..................... | B62D 15/029 |
| 9,230,442 B2* | 1/2016 | Bowers | ................... | B60Q 9/008 |
| 2010/0066518 A1* | 3/2010 | Ohshima | ................... | B60R 1/00 |
| | | | | 340/435 |
| 2012/0029809 A1* | 2/2012 | Lee | ..................... | G01C 21/3647 |
| | | | | 701/523 |
| 2013/0108105 A1* | 5/2013 | Yoo | ........................ | H04N 5/272 |
| | | | | 382/103 |
| 2016/0119612 A1* | 4/2016 | Wu | ........................... | G06T 7/80 |
| | | | | 348/48 |
| 2016/0344973 A1* | 11/2016 | Huebner | ................... | B60R 1/00 |
| 2016/0358022 A1* | 12/2016 | Dziurda | ............. | G06K 9/00791 |
| 2017/0057474 A1* | 3/2017 | Zeng | ........................ | B60T 7/22 |

* cited by examiner

*Primary Examiner* — Jerome Grant, II
(74) *Attorney, Agent, or Firm* — Norton Rose Fulbright US LLP; Gerard Messina

(57) ABSTRACT

A method for producing a masking instruction for a camera of a vehicle, the method including a setting step, a transforming step, and a storing step. In the setting step, interpolation points of a field-of-view boundary are set in a vehicle coordinate system using three-dimensional model data of the vehicle, the interpolation points being set from a camera perspective that is modeled in the model data. In the transforming step, vehicle coordinates of the interpolation points from the vehicle coordinate system are transformed into a spherical coordinate system to obtain spherical coordinates of the interpolation points. In the storing step, a mask curve defined by the interpolation points, is stored in the spherical coordinate system in order to produce the masking instruction.

9 Claims, 5 Drawing Sheets

METHOD AND DEVICE FOR PRODUCING A MASKING INSTRUCTION, AS WELL AS FOR MASKING IMAGE INFORMATION FROM A CAMERA

CROSS REFERENCE

The present application claim the benefit under 35 U.S.C. § 119 of German Patent Application No. DE 102015209391.3 filed on May 22, 2015, which is expressly incorporated herein by reference in its entirety.

FIELD

The present invention relates to a device or to a method according to the species defined in the independent claims. The present invention is also directed to a computer program.

The field-of-view of fish-eye cameras used for motor vehicles extends over a large aperture angle. For that reason, large portions of the motor vehicle body are also visible in the image of a fish-eye camera mounted on a vehicle.

SUMMARY

In accordance with the present invention, a method for producing a masking instruction for a camera of a vehicle, a method for masking image information; furthermore a device that employs this method, as well as, finally, a corresponding computer program are provided.

Besides a detail view of an area surrounding the vehicle, a wide-angle lens camera, which is permanently mounted on a vehicle, mostly projects an image of part of a vehicle body into a camera image. However, in the area of the vehicle body, the camera image does not contain any relevant information about the vehicle's image-processing convenience and safety functions.

In order to reduce a volume of data to be processed in the image processing, the vehicle body may be defined by a mask as an image area that is not to be processed. The same mask may be used for each camera image as long as the camera is connected to the vehicle body at a fixed angle.

The mask may be predefined using known optical properties of the camera and a known placement and orientation of the camera relative to the vehicle body already on the basis of a data model of the vehicle.

An example method is presented for producing a masking instruction for a camera of a vehicle, the method including the following steps:

setting interpolation points of a field-of-view boundary in a vehicle coordinate system using three-dimensional model data of the vehicle, the interpolation points being set from a camera perspective that is modeled in the model data;

transforming vehicle coordinates of the interpolation points from the vehicle coordinate system into a spherical coordinate system to obtain spherical coordinates of the interpolation points; and storing a mask curve defined by the interpolation points in the spherical coordinate system in order to produce the masking instruction.

A masking instruction may be understood to be a processing instruction that defines a mask for image information from a camera. The masking instruction may be produced on the basis of coordinates of interpolation points. A mask curve may be a polynomial that is derived from the coordinates of the interpolation points. A vehicle coordinate system may be based on a coordinate origin defined relative to the vehicle. For example, the coordinate origin may be located in the middle between the wheel centers of the front wheels. The vehicle coordinate system may be a Cartesian coordinate system whose axes conform to a vehicle longitudinal axis, a vehicle transversal axis, and a vehicle vertical axis. A spherical coordinate system may be based on a coordinate origin defined relative to the camera. A reference axis of the spherical coordinate system may be an optical axis of the camera, for example. Spherical coordinates may include at least one polar angle and one azimuth angle. Upon transformation, the coordinates of the interpolation points may be shifted and rotated using a vector and a solid angle. The coordinates may also be converted using trigonometric functions.

The spherical coordinate system may be a normalized spherical coordinate system for obtaining normalized spherical coordinates. The spherical coordinates may thereby relate to a unit sphere having a radius of one. This eliminates a coordinate value of the spherical coordinates.

A coordinate origin of the spherical coordinate system may correspond to vehicle coordinates of the camera. For example, the coordinate origin may be disposed in an optical reference point of the camera. The reference point may be a nodal point, for example.

In the setting step, the interpolation points may be set along a vehicle body edge, producing the field-of-view boundary. This enables interpolation point positions to be readily found.

The interpolation points may be set as the vehicle coordinate system in a Cartesian coordinate system. This makes it possible for data that are typically already present in a Cartesian coordinate system to be used to implement the method.

The three-dimensional model data may advantageously represent data generated using a CAD program (CAD=computer-aided design). This makes it possible to create the masking instruction without using image data from the camera.

Furthermore, a method is presented for masking image information from a camera of a vehicle, the method including the following steps:

reading in the image information from the camera; and applying a masking instruction to the image information in order to mask a field-of-view of the camera in the image information.

The methods presented here may be implemented, for example, in software or hardware or in a software and hardware hybrid, for example, in a control unit.

The approach presented here also provides an example device that is adapted for implementing, controlling, respectively realizing the steps of a variant of a example method presented here in corresponding devices. This design variant of the present invention in the form of a device also makes it possible for the object of the present invention to be achieved rapidly and efficiently.

A device may be understood here to be an electrical device that processes sensor signals and outputs control and/or data signals as a function thereof. The device may have an interface that may be implemented in hardware and/or software. When implemented in hardware, the interfaces may be part of what is commonly known as an ASIC system, for example, that includes a wide variety of functions of the device. However, the interfaces may also be separate, integrated circuits or be at least partly composed of discrete components. When implemented in software, the interfaces may be software modules that are present on a microcontroller, for example, in addition to other software modules.

Also advantageous is a computer program product or computer program having program code, which may be stored on a machine-readable medium or storage medium, such as a semiconductor memory, a hard-disk memory or an optical memory, and is used to implement, realize and/or control the steps of the method in accordance with one of the specific embodiments described above, in particular when the program product or program is executed on a computer or a device.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
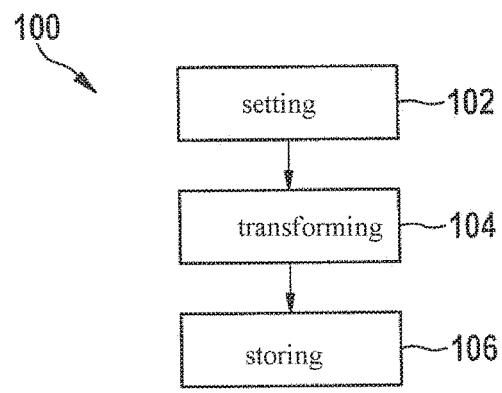
FIG. 1 shows a flow chart of a method for producing a masking instruction for a camera of a vehicle in accordance with an exemplary embodiment.

The description below of advantageous exemplary embodiments of the present invention employs the same or similar reference numerals for the elements that are shown in the various figures and whose function is similar, there being no need to repeat the description of these elements.

FIG. 1 shows a flow chart of a method 100 for producing a masking instruction for a camera of a vehicle in accordance with an exemplary embodiment. Method 100 includes a setting step 102, a transforming step 104, and a storing step 106. In setting step 102, interpolation points of a field-of-view boundary of the camera are set in a vehicle coordinate system using three-dimensional model data of the vehicle. The interpolation points are set from a camera perspective that is modeled in the model data. In transforming step 104, vehicle coordinates of the interpolation points from the vehicle coordinate system are transformed into a spherical coordinate system to obtain spherical coordinates of the interpolation points. In storing step 106, a mask curve defined by the interpolation points in the spherical coordinate system is stored in order to produce the masking instruction.

Figure 2:
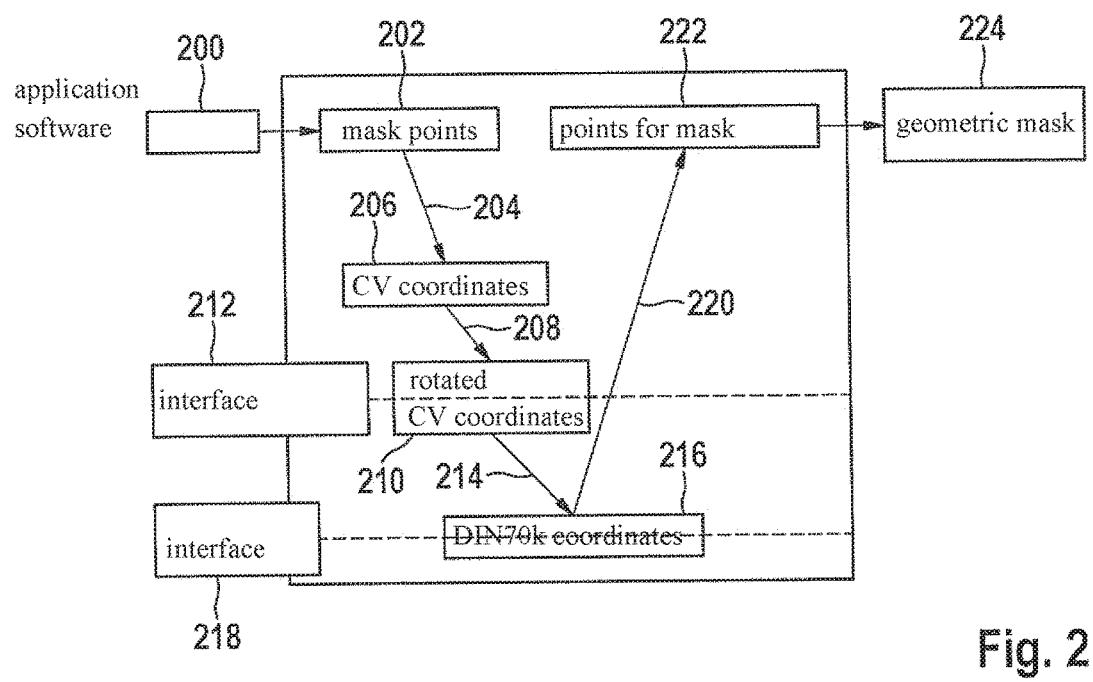
FIG. 2 illustrates transformations during a method for producing a masking instruction in accordance with an exemplary embodiment.

FIG. 2 illustrates transformations during a method for computing a mask in accordance with an exemplary embodiment. Mask points 202 in image information are thereby selected in an application software 200. Using a first processing instruction 204, image coordinates of mask points 202 are converted into CV coordinates 206 (CV=control vertex). In particular, first processing instruction 204 is referred to as m_trafo_pc1->image2rayCV. Taking into account a first extrinsic parameter R 208, CV coordinates 206 are converted into rotated CV coordinates 210. Rotated CV coordinates 210 represent an interface 212 presented here. Taking into account a second extrinsic parameter t 214, rotated CV coordinates 210 are converted into DIN70k coordinates 216. DIN70k coordinates 216 represent an existing interface 218. Using a second processing instruction 220, DIN70k coordinates 216 are converted into points 222 for the mask. In particular, second processing instruction 220 is referred to as m_trafo_pc1->world2image. A geometric mask 224 to be applied to image information is created from points 222.

Figure 3:
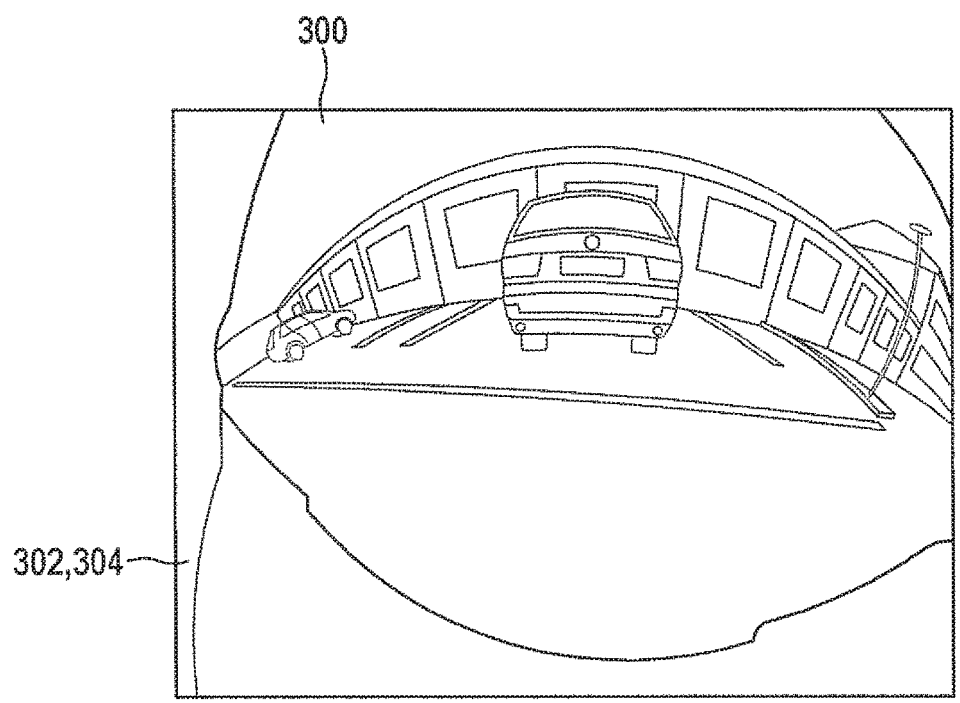
FIG. 3 illustrates image information from a lateral camera of a vehicle.

FIG. 3 illustrates image information 300 from a lateral camera of a vehicle 302. The field-of-view of fish-eye cameras extends over a large aperture angle. Discernible in image 300 are both the area relevant to signal processing, as well as large parts of motor vehicle body 304 and other vehicle parts. However, no relevant objects or information are measurable in the area of vehicle body 304 for the signal processing and further driving features. Instead, objects reflected on the metal surface may result in the misinterpretation of objects. For example, the reflection on smooth vehicle body 304 causes a white lane marking to likewise produce an apparent lane marking on the vehicle. The subsequent signal processing step then requires a complex process of recognizing and filtering the incorrect marking. For this purpose, the approach described here does not require a static mask (not shown).

Figure 4:
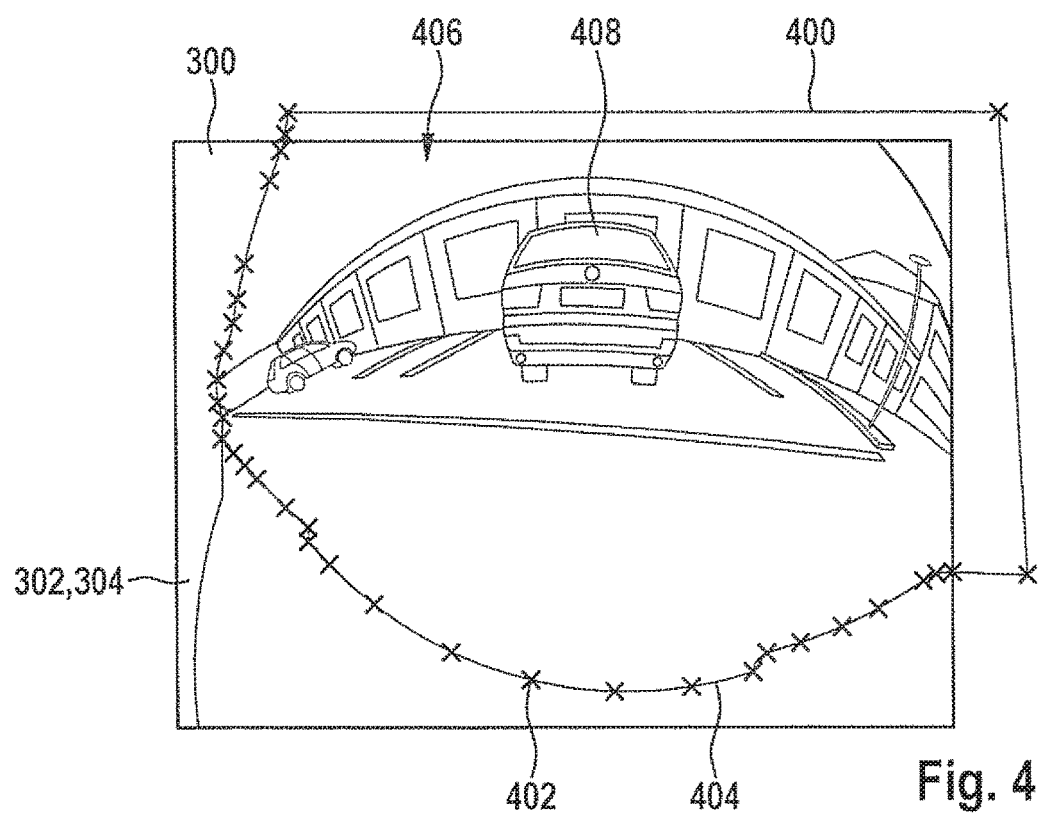
FIG. 4 illustrates image information from a lateral camera of a vehicle having a mask in accordance with an exemplary embodiment.

FIG. 4 illustrates image information 300 from a lateral camera of a vehicle 302 having a mask 400 in accordance with an exemplary embodiment. The image information thereby corresponds to that in FIG. 3. Also depicted here are interpolation points 402 for mask 400 along a field-of-view boundary 404 between the mapping of vehicle body 304 and a field-of-view 406.

In other words, FIG. 4 shows interpolation points 402 for the mask creation. To ensure from the outset that only relevant objects 408 are considered and that computationally intensive and error-prone filtering of incorrect objects is avoided, a masking 400 of relevant image regions 406 may be used in the signal processing. In the image, the contour of masking 400 generally extends along vehicle body edge 404. A separate mask 400 is used for each of the cameras used in vehicle 302.

The vignetting of the camera is discernible in the corner regions due to the pronounced distortion of the fish-eye optics, as is evident here in the upper right corner. This is recognized by the intrinsic calibration and automatically considered as part of mask 400.

One exemplary embodiment provides that the mask parameters be generated either as a function of CAD data of vehicle 302 in relation to body edge 404 of vehicle 302 to the camera, or as a function of the marking of image points 402 in camera image 300 and a conversion to polar coordinates using intrinsic and extrinsic calibration. The mask parameters are stored in the interface in polar coordinates (phi, theta, r=1) using the reference system of the camera of vehicle 302. The actual computation of mask 400 takes place in the control unit using the instantaneous intrinsic and extrinsic calibration. The mask parameters in the interface are independent of the camera properties since they only include coordinates. Mask 400 is first computed using the intrinsic and extrinsic calibration, so that mask 400 is dependent on the camera properties, such as the angular aperture of the camera.

In response to a change in the extrinsic calibration, mask 400 is recomputed by an online calibration. The vignetting is already taken into account by the intrinsic calibration used. Only one parameter set is needed per vehicle variant. Expansion of the interface in Cartesian coordinates ([x,y,z] respectively [phi, theta, r] where r #1) is possible.

Figure 5:
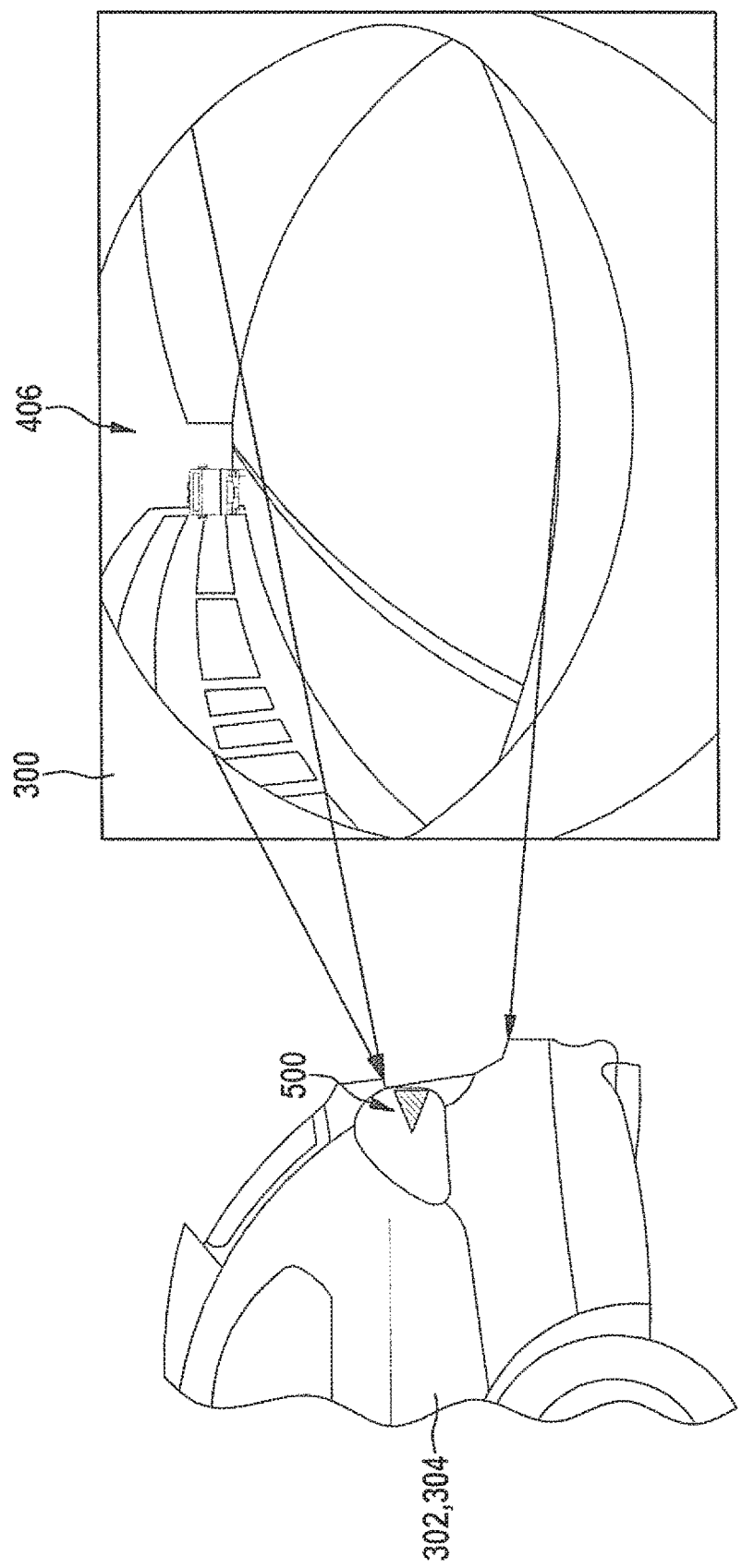
FIG. 5 illustrates a field-of-view of a rearview camera of a vehicle.

FIG. 5 illustrates a field-of-view 406 of a rearview camera of a vehicle 302. As in FIGS. 3 and 4, an image of vehicle body 304 is also projected into image information 300. An edge of a tailgate of vehicle 302, as well as a part of a rear bumper of vehicle 302 are mapped here on the basis of a camera position 500 in the area of the license-plate illumination. The field-of-view of the camera is thereby limited by the vehicle dimensions.

Figure 6:
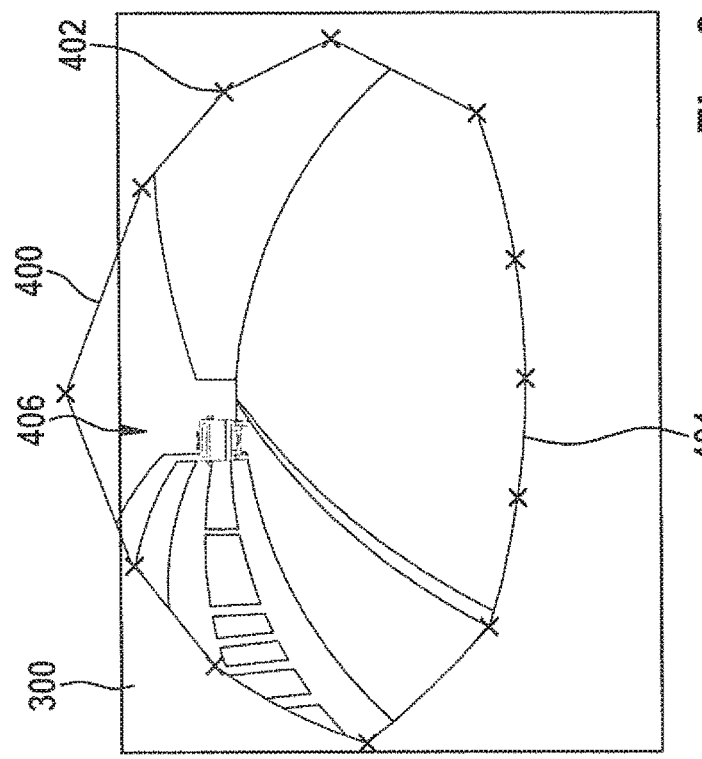
FIG. 6 illustrates model data of a vehicle having interpolation points in accordance with an exemplary embodiment.
Figure 6:
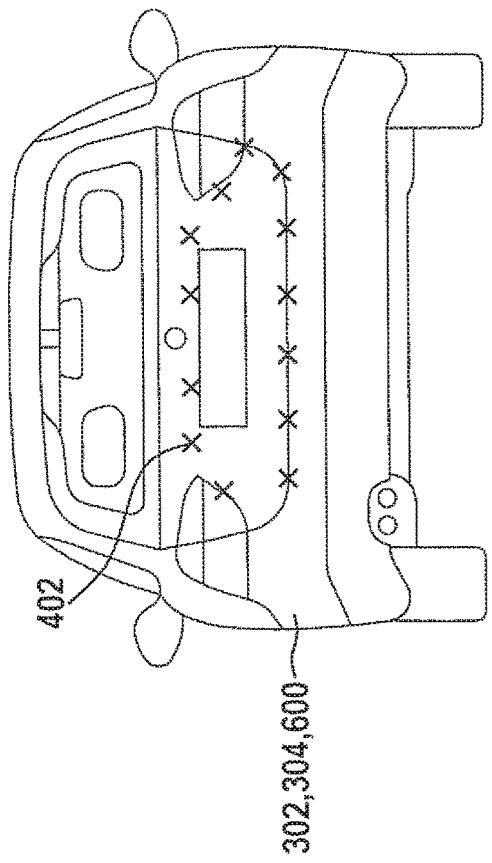

FIG. 6 illustrates model data 600 of a vehicle 302 using interpolation points 402 in accordance with an exemplary embodiment. Vehicle 302 thereby essentially corresponds to the vehicle in FIG. 5. Vehicle 302 is depicted in a rear view in CAD data 600. CAD data 600 are shown in a vehicle coordinate system of vehicle 302. Besides vehicle 302, image information 300 is displayed, as shown in FIG. 5. In CAD data 600, interpolation points 402 are marked along a top edge of the bumper and the edge of the tailgate. Interpolation points 402 are also represented in image information 300. Interpolation points 402 are displayed in a coordinate system of the camera in image information 300.

Since the rearview camera has a fish-eye lens, the greater the distance thereof from an optical axis of the fish-eye lens, the more highly curved the straight lines are displayed. The edge of the tailgate is, in particular, nearly projected in a semicircular distortion. The top edge of the bumper is closer to the optical axis and is, therefore, less distorted.

Mask 400, which separates field-of-view 406 from the image of vehicle body 304, is sketched along interpolation points 402 in the image information. An FPGA supported masking of the flow computation takes place in field-of-view 406. Because of the mask, there is no computation of flow vectors on vehicle body portions in image 300, such as of reflecting surfaces. This greatly simplifies the subsequent image processing and graphics. Similarly, a contamination sensing may be performed in response to a portion of field-of-view 406 being covered by dirt in front of the camera lens.

In other words, the masking is performed on the basis of the field-of-view covering by vehicle body 304. In this regard, in the approach presented here, field-of-view 406 is determined from CAD data 600, and a storing is carried out as a vehicle-specific encoding. In CAD data 600, a plurality of points 402 are defined on vehicle body 304 that bound field-of-view 406 between the camera and the surrounding field. Mask 400 is subsequently produced with the aid of the actually ascertained installation parameters (extrinsic calibration).

In other words, FIG. 6 shows a masking 400 of vehicle parts in camera image 300, respectively a vehicle-specific encoding of image masking 400.

Since contour 400 of the masking extends along vehicle body 304, creating mask 400 is a geometric task. From the position of the camera and CAD design 600 of vehicle 302, interpolation points 402, which describe field-of-view boundary 404, may be marked on vehicle 302. These interpolation points 402 are stored in the mask interface as a closed curve 400 having normalized spherical coordinates ($\varphi$, $\theta$, r=1; in DIN70k; the origin is the camera position). In the mask computation, the normalized coordinates are transformed by the intrinsic and extrinsic calibration into imager image 300 and combined into a mask 400 by interpolation among interpolation points 402.

Changes in the intrinsic calibration and a modified rotation of the camera (extrinsic calibration) are automatically taken into consideration when mask 400 is stored in spherical coordinates in the interface and the computation is performed using intrinsic and extrinsic calibration.

Figure 7:
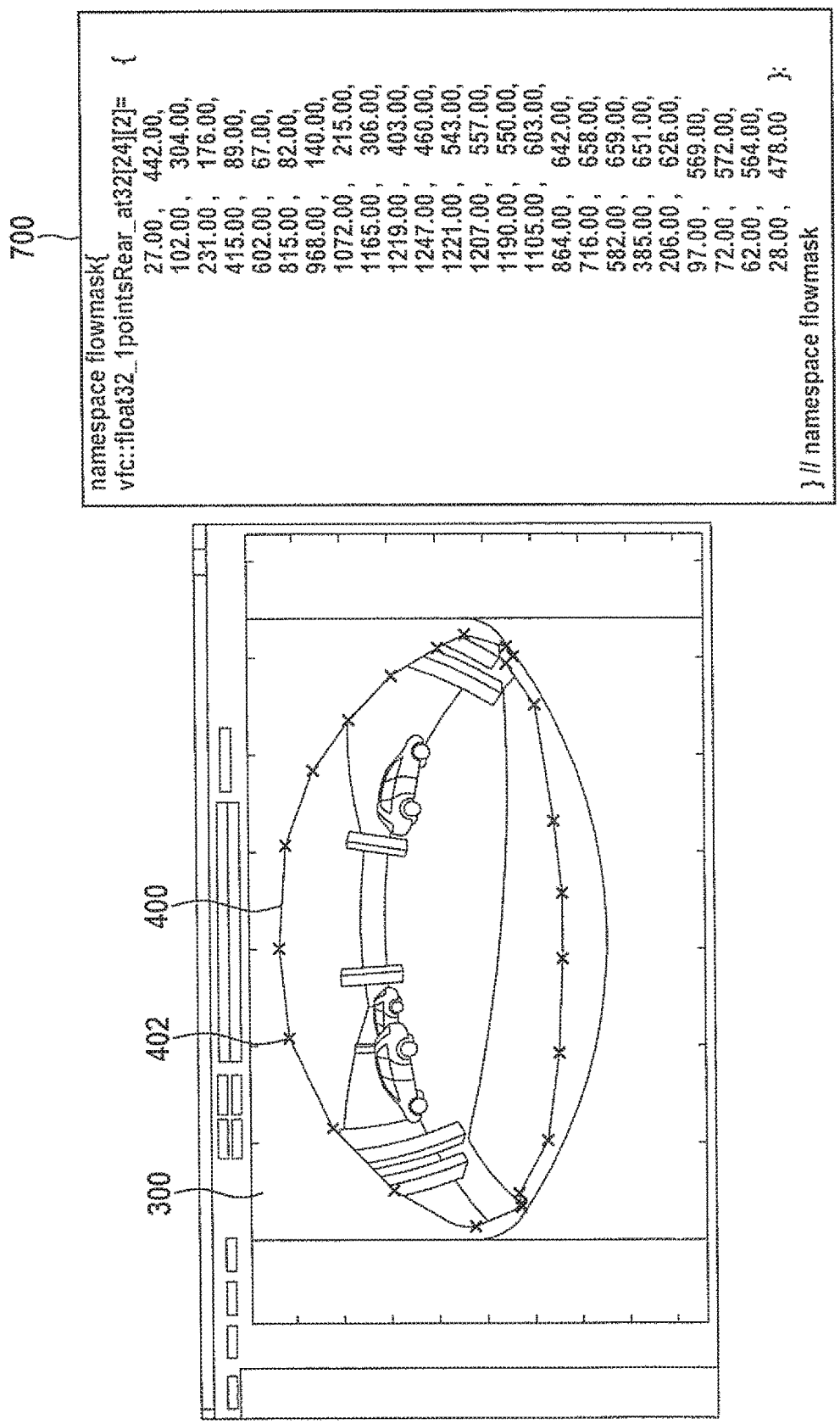
FIG. 7 shows a mask produced from masking information for image information in accordance with an exemplary embodiment.

FIG. 7 shows a mask 400 produced from masking information for image information 300 in accordance with an exemplary embodiment. To create interpolation points 402, a single camera image 300 may be used, and boundary points 402 may be plotted in image 300. These image points 402 are likewise transformed into the normalized spherical coordinates for the mask interface using a valid intrinsic and extrinsic calibration. The mask is created in each case for various vehicle variants, and variant-specific mask points 402 are entered into CAF file 700.

In other words, a closed point set 402 is drawn for the marking of mask 400 and for the exporting as C++- code 700.

A comparison of coordinate systems reveals that no geometric data are recorded in response to a displacement of mask points 402. Only mask points 402, which are displaced in accordance with a calibration modification, are approximated. It is thereby not possible to record a modification of intrinsic parameters. A modification of extrinsic parameter R may be recorded. On the other hand, it is not possible to record a modification of extrinsic parameter t.

In the case of rotated CV coordinates, respectively translated DIN70k coordinates, relative coordinates of the vehicle body edges for the imager position may be recorded in accordance with $x^2+y^2+z^2=1$. Besides any displacement of mask points 402, it is possible to record the change in the intrinsic parameters.

In the case of absolute DIN70k coordinates, the vehicle body edges may be precisely geometrically measured. In addition to the rotated CV coordinates, the change in the extrinsic parameter t may also be recorded.

If an exemplary embodiment includes an "AND/OR" logic operation between a first feature and a second feature, then this is to be read as the exemplary embodiment in accordance with a first specific embodiment having both the first feature, as well as the second feature and, in accordance with another specific embodiment, either only the first feature or only the second feature.

What is claimed is:

1. A method for producing a masking instruction for a camera of a vehicle, comprising:
    setting interpolation points of a field-of-view boundary in a vehicle coordinate system using three-dimensional model data of the vehicle, the interpolation points being set from a camera perspective that is modeled in the three-dimensional model data of the vehicle;
    transforming vehicle coordinates of the interpolation points from the vehicle coordinate system into a spherical coordinate system to obtain spherical coordinates of the interpolation points; and
    storing a mask curve defined by the interpolation points in the spherical coordinate system to produce the masking instruction;
    wherein the masking instruction defines at least one relevant image region which is to be one of processed or not processed,
    wherein actual computation of the masking instruction occurs in a control unit using intrinsic calibration and extrinsic calibration, parameters of the masking instruction being independent of intrinsic parameters of the camera, and wherein the masking instruction is first computed using the intrinsic calibration and extrinsic calibration, so that the masking instruction depends on the extrinsic parameters of the camera, including its position.

2. The method as recited in claim 1, wherein, in transforming step, the spherical coordinate system is a normalized spherical coordinate system for obtaining normalized spherical coordinates.

3. The method as recited in claim 1, wherein, in transforming step, a coordinate origin of the spherical coordinate system corresponds to vehicle coordinates of the camera.

4. The method as recited in claim 1, wherein, in the setting step, the interpolation points are set along a vehicle body edge that produces the field-of-view boundary.

5. The method as recited in claim 1, wherein, in the setting step, the interpolation points are set as the vehicle coordinate system in a Cartesian coordinate system.

6. The method as recited in claim 1, wherein, in the setting step, the three-dimensional model data represent data generated using a CAD program.

7. The method as recited in claim 1, wherein one of the following is satisfied: (i) the masking instruction defines the at least one relevant image region as an image area of a part of the vehicle that is not to be processed, or (ii) an inverted masking instruction defines the at least one relevant image region as an image area that is not to be processed.

8. A method for masking image information from a camera of a vehicle, the method comprising:
 reading in the image information from the camera;
 setting interpolation points of a field-of-view boundary in a vehicle coordinate system using three-dimensional model data of the vehicle, the interpolation points being set from a camera perspective that is modeled in the three-dimensional model data of the vehicle;
 transforming vehicle coordinates of the interpolation points from the vehicle coordinate system into a spherical coordinate system to obtain spherical coordinates of the interpolation points;
 storing a mask curve defined by the interpolation points in the spherical coordinate system to produce a masking instruction; and
 applying the masking instruction to the image information to mask the field-of-view of the camera in the image information;
 wherein the masking instruction defines at least one relevant image region which is to be one of processed or not processed,
 wherein actual computation of the masking instruction occurs in a control unit using intrinsic calibration and extrinsic calibration, parameters of the masking instruction being independent of intrinsic parameters of the camera, and
 wherein the masking instruction is first computed using the intrinsic calibration and extrinsic calibration, so that the masking instruction depends on the extrinsic parameters of the camera, including its position.

9. A machine-readable storage medium storing a computer program for masking image information from a camera of a vehicle, the computer program, when executed on a processor, causing the processor to perform:
 reading in the image information from the camera;
 setting interpolation points of a field-of-view boundary in a vehicle coordinate system using three-dimensional model data of the vehicle, the interpolation points being set from a camera perspective that is modeled in the three-dimensional model data of the vehicle;
 transforming vehicle coordinates of the interpolation points from the vehicle coordinate system into a spherical coordinate system to obtain spherical coordinates of the interpolation points;
 storing a mask curve defined by the interpolation points in the spherical coordinate system to produce a masking instruction; and
 applying the masking instruction to the image information to mask the field-of-view of the camera in the image information;
 wherein the masking instruction defines at least one relevant image region which is to be one of processed or not processed,
 wherein actual computation of the masking instruction occurs in a control unit using intrinsic calibration and extrinsic calibration, parameters of the masking instruction being independent of intrinsic parameters of the camera, and
 wherein the masking instruction is first computed using the intrinsic calibration and extrinsic calibration, so that the masking instruction dependent on the extrinsic parameters of the camera, including its position.

* * * * *